April 5, 1949.
A. GENOVESE
2,466,587
EXTRUDER AND CUTTER MECHANISM
Filed Aug. 2, 1946
2 Sheets-Sheet 1
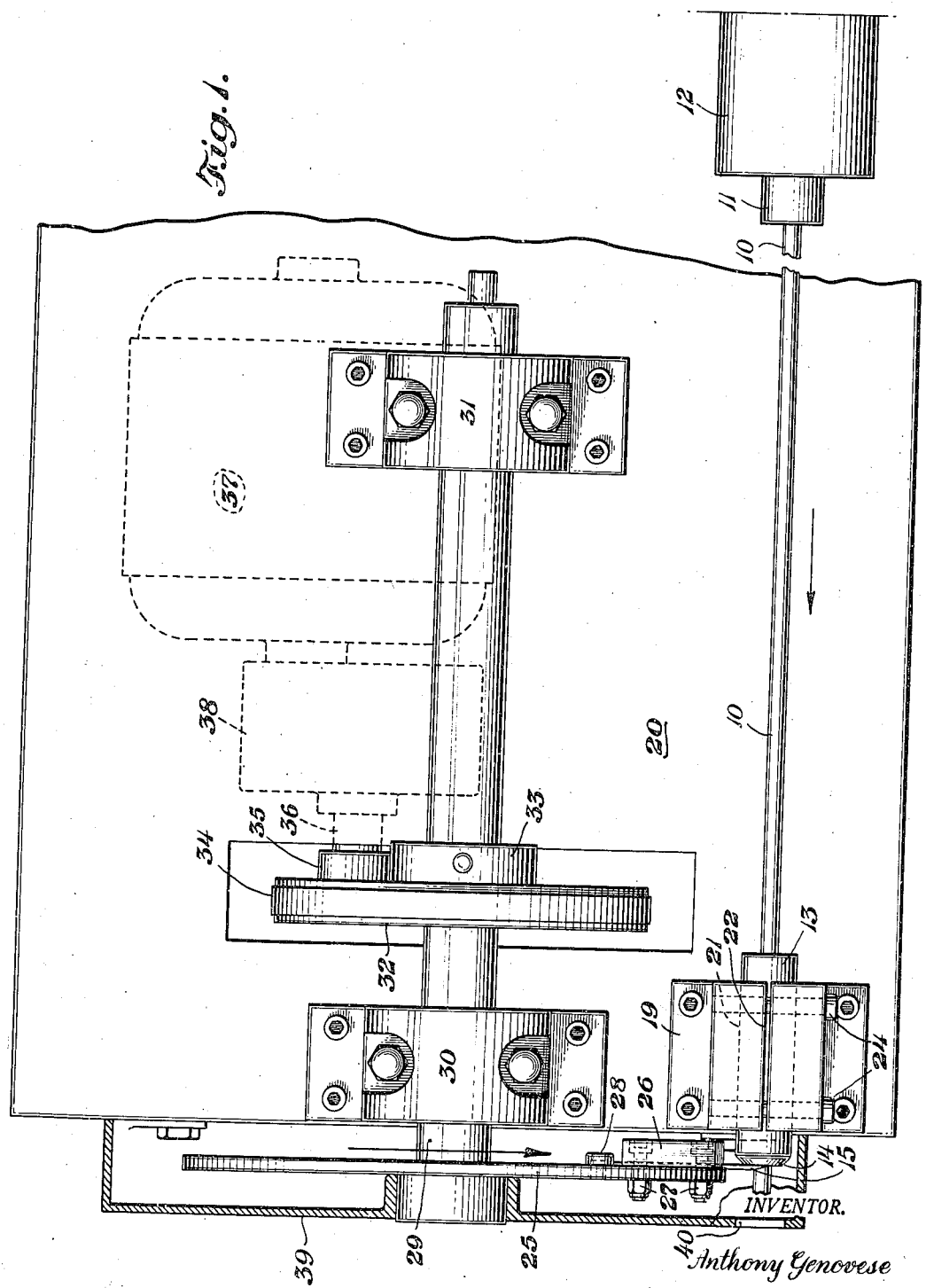
INVENTOR.
Anthony Genovese
By Karl W. Flocks
Atty.

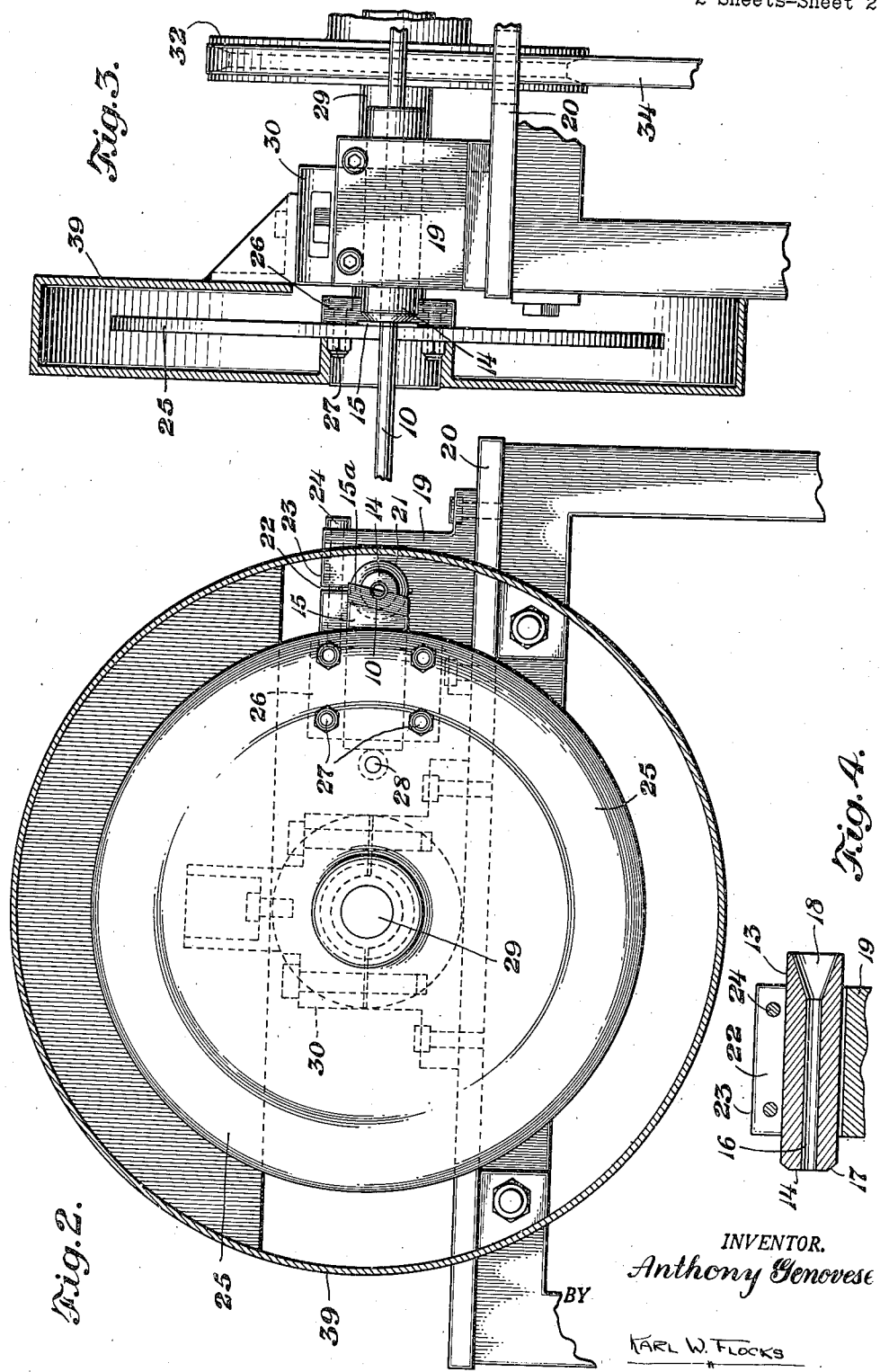

Patented Apr. 5, 1949

2,466,587

UNITED STATES PATENT OFFICE 2,466,587

EXTRUDER AND CUTTER MECHANISM

Anthony Genovese, Baltimore, Md., assignor to The National Plastic Products Company, Odenton, Md., a corporation of Maryland Application August 2, 1946, Serial No. 688,142

4 Claims. (Cl. 18—12)

This invention relates to the cutting of material as it is extruded from an extrusion machine into substantially uniform lengths and more particularly has to do with the cutting of a thermoplastic extrusion into uniform lengths simultaneously and continuously with relation to the extrusion as it is manufactured.

Prior to the instant invention it has been customary to cut rather long lengths of the extruded product as it is extruded, which rather long lengths are then bundled and cut by power saws into desired lengths with accompanying utilization of considerable measure of labor and attendant waste of material.

It is an object of the instant invention to teach the cutting of extruded material of the character of thermoplastics without injuring the extrusion, without waste and with the utilization of a minimum of labor.

Other objects and the nature and advantages of the instant invention will be apparent from the following description taken in conjunction with the accompanying drawings, wherein:

Figure 1 is a top plan view of the device in accordance with the invention with parts broken away and parts shown in section.

Fig. 2 is an end view of the device shown in Fig. 1 with parts broken away and parts shown in section.

Fig. 3 is a front view in elevation of a portion of the apparatus shown in Fig. 1 with parts broken away and parts shown in section; and Fig. 4 is a fragmentary sectional view in detail showing a vertical section through the stationary element of the cutter die.

Referring to the drawings, the extrusion 10 leaves the die 11 of the extruder 12, passes through the air or other tempering or treating medium or stage to the work supporting and stationary die 13 of the cutter. The extrusion 10 actually passes entirely through the element 13 and on the side 14 from which it emerges the extrusion presents itself to the action of the cutter blade 15 which will be later described.

The work supporting and stationary die 13 comprises a cylindrical body having a bore 16 extending therethrough which bore in section has a contour or profile which corresponds to the finished extruded section. The outside corner of the side 14 of the element 13 is neatly beveled as at 17. The inlet side 18 of the element 13 is provided with a funnel shaped cavity which communicates with the bore 16 so that the extrusion may be readily threaded within the bore 16, which is of such size that the extrusion may pass therethrough with substantially no frictional resistance.

The element 13 is adapted to be carefully mounted in the supporting block 19 which in turn is mounted on the frame 20. The supporting block 19 is provided with a cylindrical opening 21 passing therethrough which acts as a sleeve for the element 13 and the block is slotted at 22 in such a manner that the slot communicates the top surface 23 of the block 19 with the top of the sleeve or cylindrical opening 21. Bolts 24 are passed through the block 19 near the top thereof in a direction transversely of the slot 22 so that the element 13 may be locked in place without putting such stress on the element 13 as might cause a strain therein and affect the section of the bore 16.

The cutter blade 15 is provided with an angularly disposed beveled cutting edge 15a and is fastened to the fly-wheel 25 by the plate 26 and the bolts 27. Plate 26 is notched out on its side which is adjacent the fly-wheel 25 so that the cutter 15 fits fairly snugly therein. The screw 28 which is secured to the fly-wheel 25, serves as a stop for the rearmost portion of the cutter 15 and thus it will be understood that the cutter 15 is rigidly anchored to the fly-wheel 25, though some adjustment is provided for which can be made by loosening bolts 27, readjusting the cutter 15 and then tightening the bolts 27.

The fly-wheel 25 is fixed to the driven shaft 29 which is journaled within the bearings 30 and 31. Secured to the driven shaft 29 between the bearings 30 and 31 is the driven pulley 32 having a hub or collar 33. The belt 34 passes over a driving pulley having hub or collar 35 and the driven pulley 32. The collar 35 of the driving pulley is secured to the driving shaft 36 which receives its rotation from the motor 37 through the variable speed transmission 38.

Mounted on the frame 20 and about the flywheel 25, cutter 15, side 14 of the element 13, is the cylindrical stationary guard member 39 which is provided with an opening 40 through which the extrusion passes before it is cut off by the action of the die mechanism which comprises the moving cutter die element 15 and the work supporting stationary die element 13.

In the operation of the device, the variable speed transmission 38 is so adjusted with respect to the rate of movement of the extrusion 10 as it leaves the extruder die 11, that for every single revolution of the fly-wheel 25 the length of extrusion that will pass through the side 14 of the element 13 will be the required size of the cut pieces of the extrusion.

When the thermoplastic extrusion leaves the die it is generally in a hot, soft condition easily marred and deformed upon application of contact pressure. Depending upon the section and the nature of the material being extruded, the extrusion as it leaves the die 11 may be air cooled, water cooled, tempered, drawn, or otherwise treated and then it is threaded into the bore 16 of the element 13 by passing it into the funnel shaped cavity in the side 18 of the element 13.

With the extrusion thus threaded through the element 13 so that it, the extrusion, passes through the opening 40 in the guard member 39, the extruded thermoplastic will be cut to the required size continuously and substantially simultaneously with its formation with no further attention required from the operator insofar as cut-off mechanism is concerned.

As the section to be cut is properly held by the stationary die element 13 and within the bore 16, and as the thermoplastic itself has been conditioned between the time it leaves the die 11 and the time it reaches the side 14 of the element 13, the cut edge of the extrusion will be neat, clean, accurate and without waste even though the extruded section be delicate in profile such as is the case with thin walled tubes, for example.

It will be obvious to those skilled in the art that various changes may be made without departing from the spirit of the invention and therefore the invention is not limited to what is shown in the drawings and described in the specification but only as indicated in the appended claims.

What is claimed is:

1. The structure recited in claim 4, a holder for said stationary die element comprising a block having a bore extending therethrough which bore has a section generally corresponding to the exterior sectional profile of said stationary die element, a slot in said block communicating the bore therethrough with one face thereof, said slot having an axis aligned with the axis of the bore through said block, and adjusting means for adjusting the width of said slot.

2. The structure recited in claim 4, said movable cutter die being mounted on a fly-wheel, said cutter die comprising a blade having an angularly disposed beveled edge fastened to said fly-wheel.

3. The structure recited in claim 4, said movable cutter die being mounted on a fly-wheel, said cutter die comprising a blade having an angularly disposed beveled edge fastened to said fly-wheel, and means for adjusting the position of said cutter blade with respect to said fly-wheel comprising a clamping plate and means for clamping said clamping plate to said fly-wheel.

4. In combination with a thermoplastic extrusion machine having a hot extrusion die, a cut-off device, said cut-off device comprising a work supporting stationary die element disposed remotely from said hot extrusion die, a movable cutter die adapted to pass transversely across one end of said stationary die, said remotely disposed stationary die being separated from said hot extrusion die by a tempering space whereby said extruded thermoplastic is cooled and hardened on its way from said hot extrusion die to said stationary die, said stationary die comprising a bored member, the bore through said member having a relatively long surface adapted to contact a relatively long portion of the surface of the thermoplastic extrusion and having a sectional profile corresponding to the shape of the thermoplastic extrusion leaving said extrusion die whereby said bore will have a section of a closed geometrical figure, the inlet side of said bored member having a funnel-shaped cavity communicating the inlet face of said bored member with the bore through said member whereby the initial feeding of the bored member with the thermoplastic extrusion is facilitated.

ANTHONY GENOVESE.

REFERENCES CITED

The following references are of record in the file of this patent:

UNITED STATES PATENTS

| Number | Name | Date |
| --- | --- | --- |
| 730,104 | Ferguson | June 2, 1903 |
| 939,895 | Dobbs | Nov. 9, 1909 |
| 1,427,831 | McCool | Sept. 5, 1922 |
| 2,365,374 | Bailey | Dec. 19, 1944 |